May 23, 1939.  H. A. CEDERSTROM  2,159,470
OPERATING MECHANISM FOR VEHICLE DUMPING BODIES
Original Filed July 10, 1933   5 Sheets-Sheet 1

INVENTOR
HAROLD A. CEDERSTROM
BY
ATTORNEYS

May 23, 1939.  H. A. CEDERSTROM  2,159,470
OPERATING MECHANISM FOR VEHICLE DUMPING BODIES
Original Filed July 10, 1933    5 Sheets-Sheet 2

INVENTOR
HAROLD A. CEDERSTROM
BY
ATTORNEYS

May 23, 1939. H. A. CEDERSTROM 2,159,470
OPERATING MECHANISM FOR VEHICLE DUMPING BODIES
Original Filed July 10, 1933 5 Sheets-Sheet 4

INVENTOR
HAROLD A. CEDERSTROM
BY Paul, Paul Moore
ATTORNEYS

May 23, 1939.　　　H. A. CEDERSTROM　　　2,159,470
OPERATING MECHANISM FOR VEHICLE DUMPING BODIES
Original Filed July 10, 1933　　5 Sheets-Sheet 5

INVENTOR
HAROLD A. CEDERSTROM
BY Paul, Paul & Moore
ATTORNEYS

Patented May 23, 1939

2,159,470

UNITED STATES PATENT OFFICE 2,159,470

OPERATING MECHANISM FOR VEHICLE DUMPING BODIES

Harold A. Cederstrom, Minneapolis, Minn., assignor to Rosco Manufacturing Company, Minneapolis, Minn., a corporation of Minnesota Original application July 10, 1933, Serial No. 679,643. Divided and this application January 28, 1937, Serial No. 122,785

3 Claims. (Cl. 298—22)

This invention relates to vehicles or trailers provided with dumping bodies, and more particularly to an improved operating mechanism for tilting the body thereof to load-dumping position, and is a division of my Patent No. 2,072,728, issued March 2, 1937.

The present invention concerns itself more particularly with the construction of the body dumping mechanism and has as an object, to provide such a mechanism which is supported entirely upon the vehicle supporting the tiltable body and which is comparatively light in weight, is simple and inexpensive in construction, and is positive and efficient in operation, whereby the apparatus may be operated at a comparatively low operating and maintenance cost.

A further object of the invention is to provide a semi-trailer adapted to be connected to a truck and having a body mounted thereon adapted to be tilted, and a body tilting mechanism being mounted directly upon the frame of the trailer, and which mechanism derives its power from the power take-off shaft of the truck engine.

A further object is to provide an apparatus of the class described comprising a semi-trailer having a frame provided with a rear axle and suitable load-carrying wheels, and a body mounted thereon for tilting movement and having an operating mechanism supported directly upon the frame of the trailer, said mechanism comprising means for equalizing the power required to tilt the body from its normal horizontal position to an inclined load-dumping position, whereby the mechanism is relieved of severe strains and stresses.

A further object is to provide a vehicle having a body mounted thereon for tilting movement and comprising a mechanism for tilting said body which is operated by a hydraulic hoist supported upon the frame of the vehicle, said hoist being provided with a safety device for rendering it inoperative when the body reaches the limit of its upward movement to thereby avoid damage to the mechanism, should the operator inadvertently fail to stop the hoist.

A further object is to provide a semi-trailer comprising a frame having its rear end portions supported upon suitable load-carrying wheels and having its forward portion provided with a fifth wheel member adapted to be coupled to a complemental fifth wheel member provided upon the rear end of a motor truck or tractor, and said trailer having a load-carrying body mounted thereon for tilting movement, and also having a mechanism supported directly upon the trailer for tilting said body to load dumping position, and a hydraulic hoist being carried upon the trailer frame and having a pump adapted to circulate fluid therethrough to tilt the body, said pump being driven from the truck engine through a series of shafts and bevel gears incorporated in the construction of the fifth wheel, and a control valve being provided in connection with a hoist for controlling the circulation of fluid therethrough, and means being provided adjacent the driver's seat on the truck for manipulating said control valve, and whereby said valve may be conveniently operated, regardless of the relative position of the trailer with respect to the tractor.

Other objects of the invention reside in the novel construction of the parts constituting the lifting mechanism of the load-carrying body; in the specific construction of the valve mechanism for controlling the circulation of the fluid through the hoist; in the operating means for said valve mechanism, whereby the latter may be operated from the driver's seat on the truck, regardless of the angular position of the truck with respect to the trailer, and whereby the movement of the dumping body may be controlled at will so that its contents may be gradually discharged therefrom, if desired; and, in the unique arrangement of the various parts of the body dumping mechanism, whereby they may readily be embodied in the construction of the semi-trailer.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Truck

Figures 4, 9:
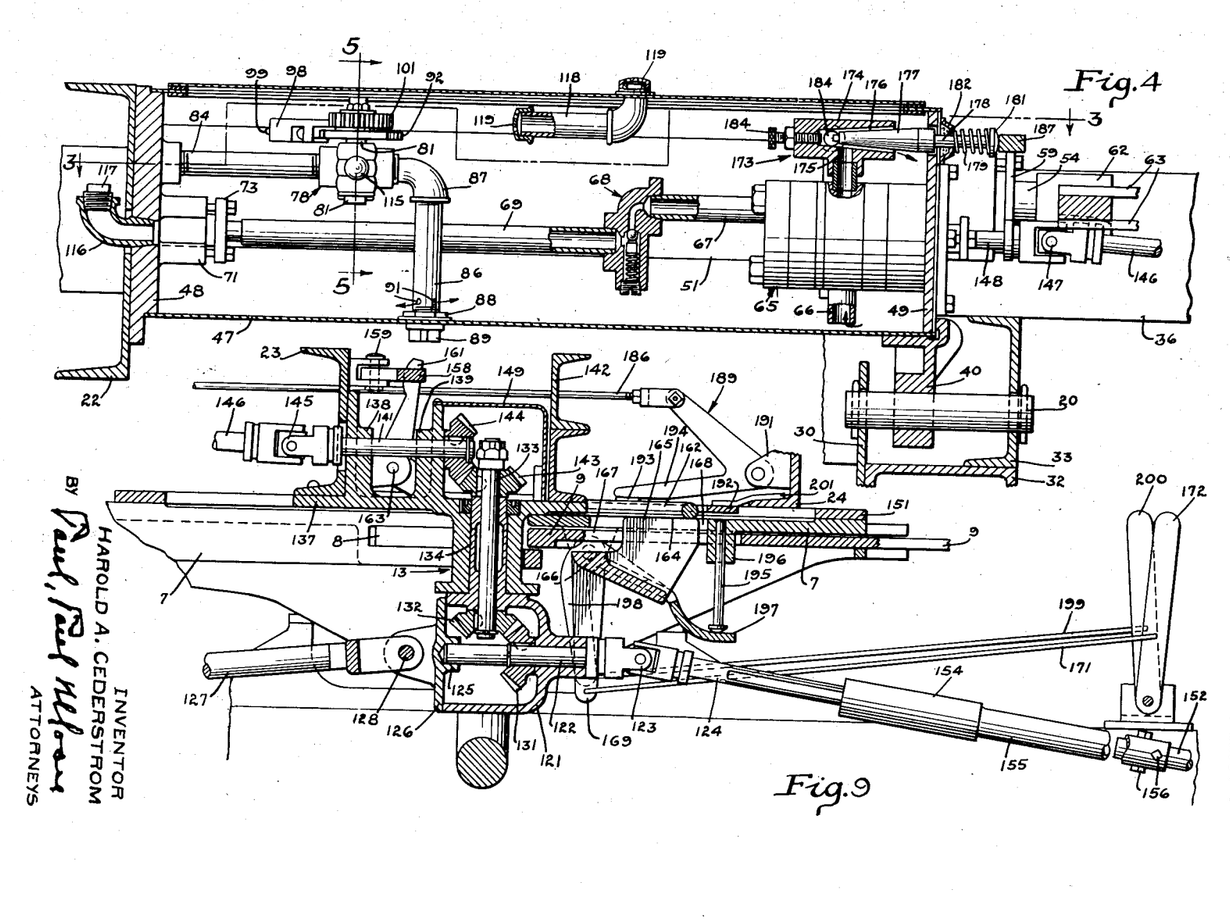
Figure 4 is a sectional elevation on the line 4—4 of Figure 3.
Figure 9 is a vertical sectional view on the line 9—9 of Figure 2, showing the means for transmitting power from the truck engine to the vehicle dumping mechanism.
Figure 7:
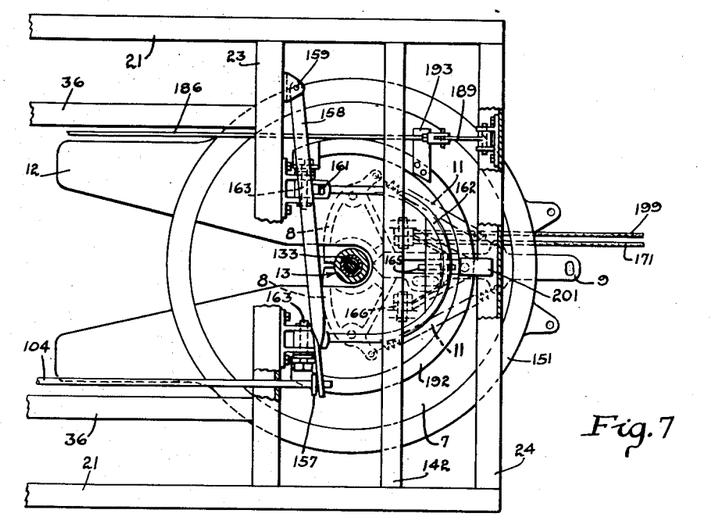
Figure 7 is a fragmentary view, showing the fifth wheel and the means for actuating the push rod of the main control valve.

In the selected embodiment of the invention here shown, there is illustrated in Figure 4, for purposes of disclosure, a commercial type of truck comprising the usual chassis 2, front and rear wheels 3 and 4, respectively, cab 5, and engine 6. The engine is shown provided with the usual power take-off shaft 10. The trailer is coupled to the tractor by a suitable fifth wheel structure comprising a lower member 7, pivotally supported upon the chassis 2 by suitable means, not shown. A pair of coupling dogs 8 are shown mounted upon the member 7, and are adapted to be retained in operative position by a locking bar 9, slidably mounted in suitable guides provided in the fifth wheel member 7. Suitable springs 11 connecting the locking bar 9 to the dogs 8, whereby said springs constantly urge the locking bar 9 in a direction to engage the dogs 8. The springs also act to support the dogs in inoperative positions, when the locking bar is moved out of locking engagement therewith. The fifth wheel member 7 is shown provided with rearwardly and downwardly extending arms 12, spaced apart as shown in Figure 7, to provide a gap therebetween adapted to receive a king pin 13 mounted on the trailer.

Trailer

Figures 1, 10:
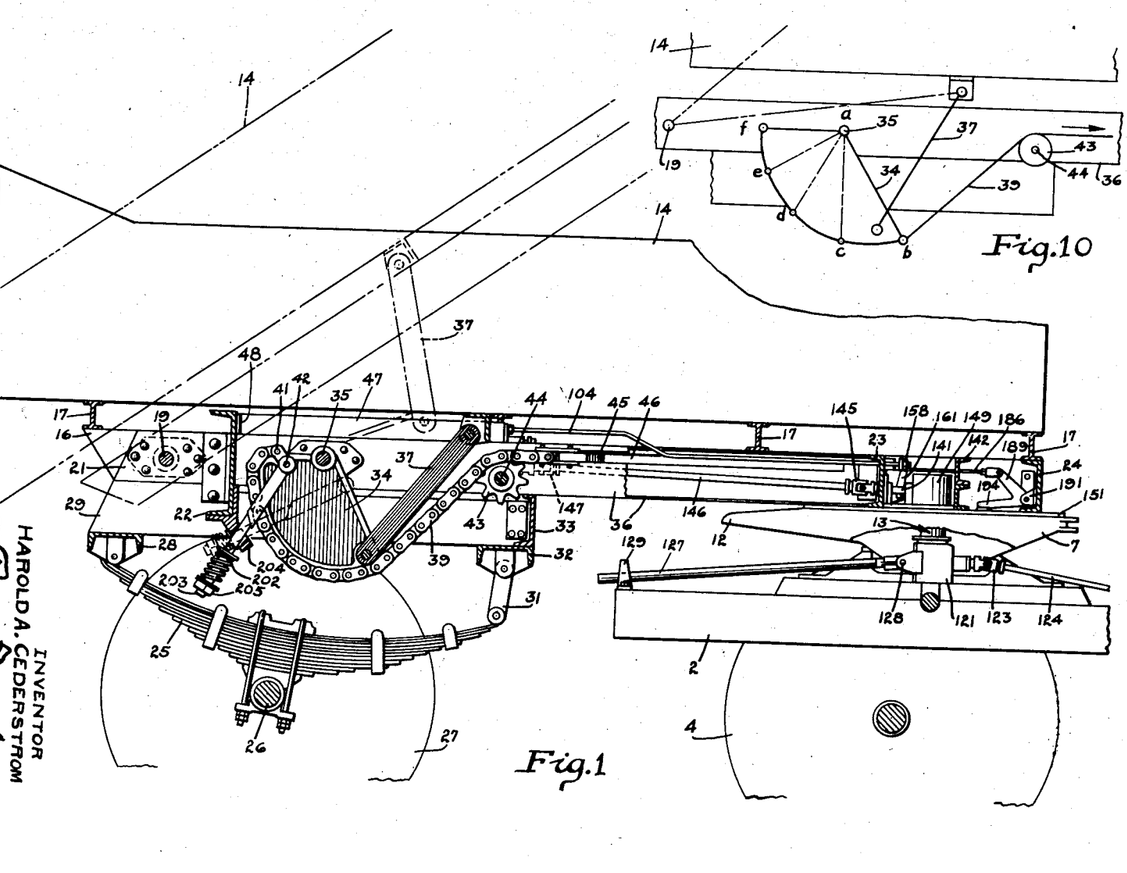
Figure 1 is a side elevation, partially in section, illustrating the mechanism for tilting the load carrying body to a load dumping position.
Figure 10 is a diagrammatic view illustrating the change in leverage of the lifting mechanism, whereby the power required to lift the load-carrying body from horizontal to load-dumping position is substantially equalized during the entire operation of tilting the vehicle body.
Figure 11:
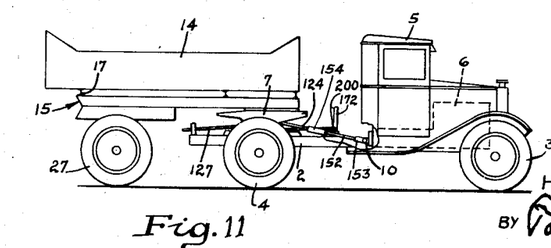
Figure 11 is a diagrammatic view showing the trailer coupled to a truck, and also showing the driving connection between the power take-off shaft of the truck and the operating mechanism of the trailer.

An important feature of this invention resides in the construction of the semi-trailer and its operating mechanism. As shown in Figures 1 and 11, the trailer comprises a dumping body 14 having a suitable supporting frame, generally indicated by the numeral 15, and composed of longitudinally extending side members 16 and transverse members 17, secured to the side members 16, and upon which the dumping body 14 is directly supported, as clearly illustrated in Figure 1.

The dumping body 14 is shown pivotally supported upon a main supporting frame, generally indicated by the numeral 18, by a suitable cross shaft 19 mounted in suitable bearings provided at the rear end of the frame 18. The frame 18 constitutes the main supporting frame of the trailer, and comprises side members 21 secured together in spaced relation by suitable cross members 22, 23, and 24. The rear end portion of the trailer frame 18 is resiliently supported upon suitable semi-elliptic springs 25, secured to an axle 26 provided with suitable carrying wheels 27. The rear ends of the springs 25 are shown pivotally connected to a cross member 28 secured to frame members 29 interposed between the cross member 28 and the side members 21 of the main frame 18. The forward ends of the springs 25 are connected by suitable shackles 31 to a cross member 32, which also is secured to the frame members 29. The forward ends of the members 29 are shown secured to a suitable transverse channel member 33, as shown in Figure 1. The forward end of the trailer is supported upon the fifth wheel member 7, as shown and described in detail in the application, hereinbefore mentioned.

Lifting mechanism

Figure 2:
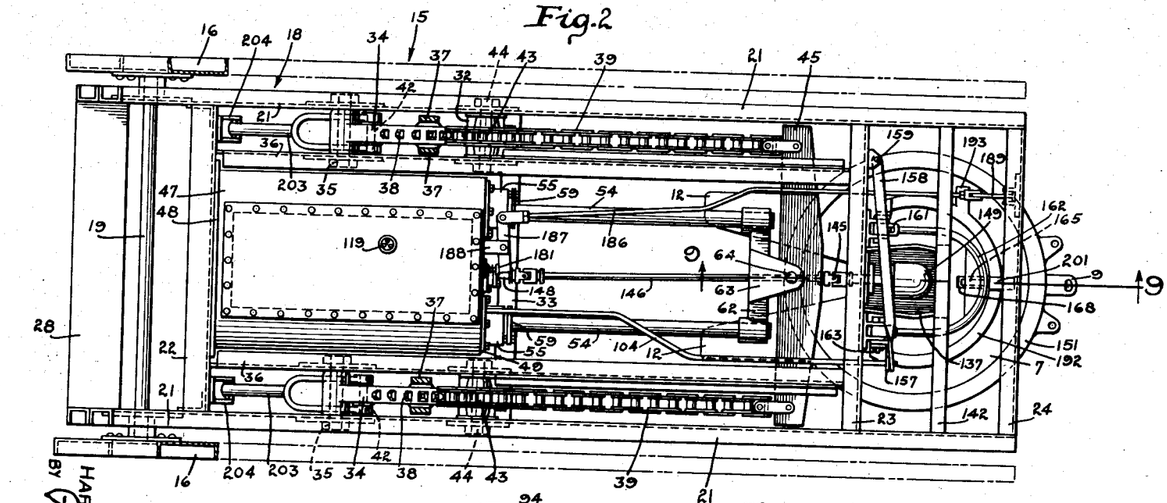
Figure 2 is a plan view of Figure 1.

Another feature of this invention resides in the means provided for tilting the body 14 to a load dumping position, as indicated by the dotted lines in Figure 1. Such means comprises a pair of cam members 34 mounted for oscillatory movement upon pivots 35 secured to the side frame members 21 of the main frame, and a pair of auxiliary frame members 36, secured to the cross members 22 and 23 in spaced parallel relation to the main frame members 21. The cam members 34, it will be noted by reference to Figure 2, are supported between the frame members 21 and 36. Suitable links 37 connect the lower ends of the cam members 34 with the dumping body 14, so that when the cams are rotated, the body will be tilted from the full line position shown in Figure 1 to an inclined position.

The cams 34 are shown provided with suitable sprocket teeth 38 adapted to receive chains 39. The end links 41 of the chains are secured to their respective cams by suitable pins 42, as shown in Figure 1. From the lower ends of the cams 34, the chains 39 pass upwardly over a pair of idler sprockets 43 mounted upon suitable studs 44 secured in position between the main frame members 21 and 36. The forward ends of the chains are connected to the ends of an equalizer bar 45. This equalizer bar is mounted in suitable guide slots 46 provided in the auxiliary frame members 36, as shown in Figure 1, whereby it is adapted for relative movement lengthwise of the main frame 18. The overall length of the equalizer bar 45 is slightly less than the spacing between the side frame members 21, whereby it may move freely therebetween, in a direction lengthwise of the trailer, while its movement in a cross-wise direction is restricted by the frame members 21.

The cam members 34 are shaped to substantially equalize the power exerted upon the equalizer bar 45 to lift the body 14 from its normal horizontal position to its load-dumping position, shown in Figure 1. To thus equalize the power to tilt the body, the cam members are so constructed as to cause the leverage to constantly vary during the lifting of the body, thereby to compensate for the shifting of the center of gravity of the load in a rearward direction towards the axis 35, about which the body tilts, during the operation of dumping the load. In other words, when the cams are in their normal positions, as shown in Figure 1, they present their greatest leverage to the power mechanism, which will subsequently be described. As the body is initially moved from its horizontal position to a load-dumping position, the leverage constantly decreases in substantially direct proportion to the rearward shifting of the center of gravity of the load, as the load is tilted, whereby the pressure in pounds exerted against the equalizer bar by the hoist is substantially equalized.

Figure 10 clearly illustrates the effect obtained by the cam members. In this figure, it will be noted that when the cams are in their normal positions, the chains 39 will be engaged with the peripheries of the cams at their greatest diameters. In other words, the spacing between the axis of the pivots 35 and the chains 39 will be equal to the distance between a and b in Figure 10. As the cams are rotated by the action of the chains, the leverage between the axis of the pivots 35 and their respective chains 39 gradually decreases, as will be clearly noted by reference to Figure 10, wherein it will be seen that when the chains 39 are substantially at right angles to an imaginary line drawn between a and c, the leverage will be shorter than when the chains are at substantially right angles to the line ab. In like manner, as the chains leave the peripheries of their respective cams at points d, e, and f, the leverage is progressively decreased, so that when the body 14 reaches the limit of its upward movement, indicated by the dotted lines in Figures 1, the pressure exerted against the equalizer bar will be substantially equal to the pressure exerted thereagainst when the load is initially moved from its horizontal position. The design of the cam members and their connections with the body 14 and with the chains 39 is therefore of utmost importance.

Actual experiments have shown that a vehicle dumping body equipped with the novel cam mechanism herein disclosed, may be operated with considerably less power than when equipped with an operating mechanism of ordinary construction, whereby less power is required to operate such a body of a given size and load, with the result that a smaller truck motor may be used.

Means is provided for initially starting the body 14 in its return movement to normal position, should the center of gravity thereof be so disposed with respect to the axis of the pivots 35 as to prevent the body from commencing its return movement by gravity, when the fluid pressure is released therefrom. Such means is shown comprising a pair of suitable compression springs 202, one for each cam member 34, mounted upon rods 203 having their upper ends forked and pivotally connected to the cam members 34 by the pins or bolts 42. The rods 203 are slidably supported in guides 204 secured to the cross frame member 22, as best shown in Figure 1. When the dumping body 14 reaches the limit of its upward tilting movement, the springs 202 will be compressed between the nuts 205 on the lower end of the rods 203 and the guides 204. When thus compressed, the springs will act to return the cam members to their normal positions, immediately upon the release of the hoisting mechanism, subsequently to be described.

Hoist

Figure 3:
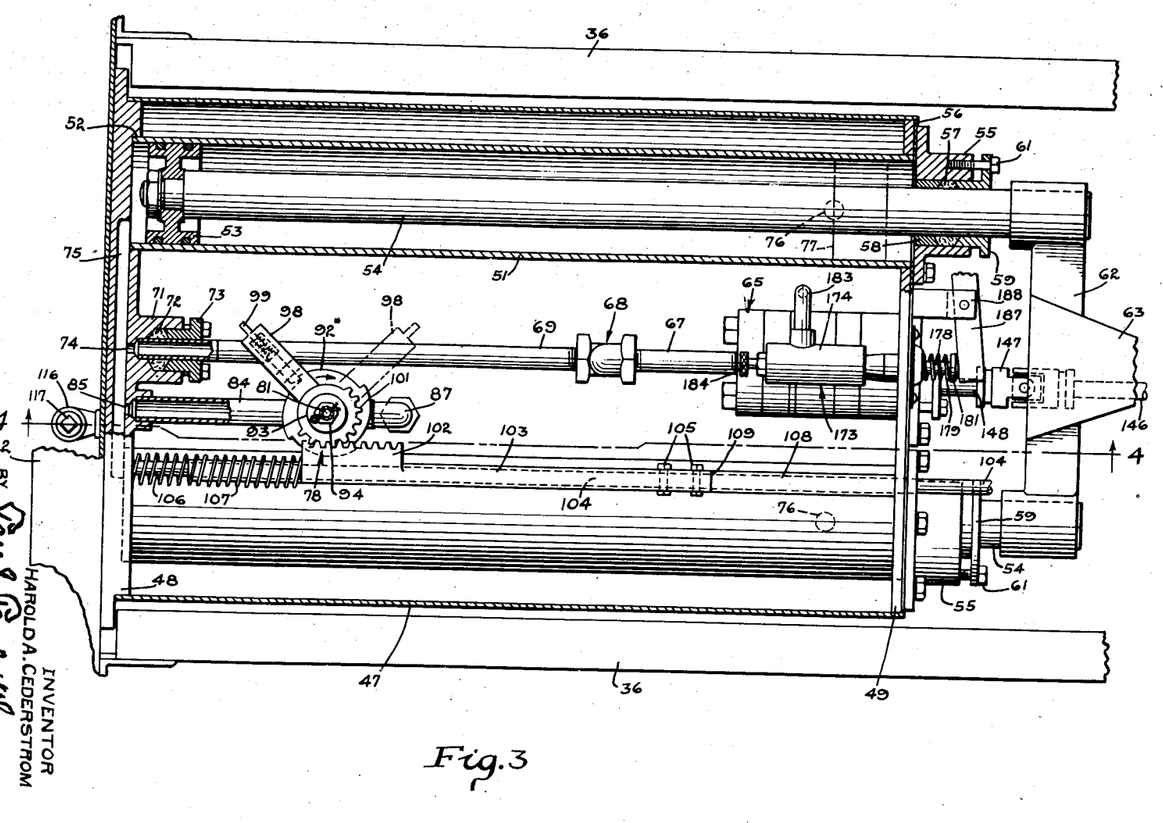
Figure 3 is an enlarged sectional plan view on the line 3—3 of Figure 4, to more clearly illustrate the hydraulic hoist.

The hoist comprises a suitable oil tight casing 47 having a head 48 secured to one end thereof which, in turn, is suitably secured to the cross member 22 of the main frame, thereby to provide a support for the rear end of the hoist. A suitable plate 49 provides a closure for the opposite end of the casing 47. This plate may be suitably welded to the walls of the casing to provide leak-tight connections between said parts. In Figures 2 and 3, the hoist is shown provided with two cylinders 51 which are substantially alike in construction and may be formed from suitable tubing. The rear ends of the cylinder are seated in suitable recesses 52 provided in the head 48. Suitable apertures are provided in the plate 49 at the opposite end of the hoist for receiving the forward ends of the cylinders 51. The cylinders are suitably welded to the plate 49 to secure them in place.

Pistons 53 are mounted in the cylinders 51 and are provided with piston rods 54, slidably supported at the forward end of the hoist by suitable guides 55 secured to the plate 49. The guides 55 provide closures for the forward ends of the cylinders, as clearly illustrated in Figure 3. Suitable gaskets 56 are interposed between the guides 55 and plate 49 to prevent leakage therebetween. Each guide 55 is provided with a suitable packing 57 adapted to be compressed between suitable packing glands 58 and 59, the latter being mounted for relative axial movement, and having a screw 61 for securing it in position.

A cross head 62 is secured to the forward ends of the piston rods 54 and has a forwardly extending forked member 63 adapted to be connected to the equalizer bar 45 by a suitable pin 64. Thus, the pistons 53 are operatively connected to the equalizer bar 45 so that when reciprocated within their respective cylinders, the chains 39 will be operated to rotate the cam members 34 about their axes.

The means for circulating the pressure fluid within the hoist consists of a suitable pump 65 which may be of any well-known construction applicable for the purpose, and it is therefore thought unnecessary herein to show and describe the same in detail. The pump 65 has an intake 66 at its lower portion which terminates adjacent to the bottom wall of the casing 47. The outlet 67 of the pump is shown connected to a suitable ball check valve 68 which, in turn, has a pipe 69 connecting it with the plate 48 through a suitable connection 71, including a packing box 72 and movable gland 73, as shown in Figure 3. An orifice 74 connects the pipe 69 with a transverse fluid distributing passage 75, the ends of which communicate with the rear ends of the cylinders, as clearly shown in Figure 3. By thus connecting the pump 65 with the cylinders 51, when the pump is operated, the fluid will be drawn from the bottom of the casing 47 into the pump, from whence it is discharged through the pipes 67 and 69 into the distributing passage 75, and thence into the cylinders 51, whereupon the pistons 53 will move forwardly from the position shown in Figure 3, and thereby impart a similar movement to the equalizer bar 45. Suitable relief ports 76 are provided in the walls of the cylinders 51 adjacent the forward ends thereof, whereby the fluid pumped into the cylinders will be released therefrom, when the pistons reach the predetermined positions, indicated by the dotted lines 77 in Figure 3.

Valve mechanism

Means is provided for releasing the fluid from the cylinders 51 to permit the body 14 to return to its normal horizontal position, after its contents have been dumped therefrom. Such means is clearly shown in Figures 3, 4, 5, and 6, and comprises a main valve, generally indicated by the numeral 78. This valve comprises a housing 79 having a plug valve 81 rotatably mounted therein and provided with a suitable fluid circulating passage 82 adapted to be moved into registration with alined apertures 83, provided in the valve housing, as shown in Figure 6. A pipe 84 has one end connected to the intake side of the valve and its opposite end to the plate 48 at the rear end of the casing 47. The pipe 84 communicates with the distributing passage 75 through an orifice 85, shown in Figure 3.

The discharge side of the valve 78 has a pipe 86 connected thereto by a suitable elbow 87. The lower end of the pipe 86 is shown connected to the lower wall of the hoist casing 47 by suitable clamping nuts 88 and 89, best shown in Figure 4. Discharge openings 91 are provided in the pipe 86 adjacent to the lower end thereof. When the plug valve 81 is positioned as shown in Figure 6, communication is established between the distributing passage 75 and the interior of the casing 47, through the valve 78, whereby the pressure fluid or oil contained in the cylinders back of the pistons, is permitted to return to the interior of the casing 47 and thus allow the body 14 to return to its normal horizontal position.

Figure 5:
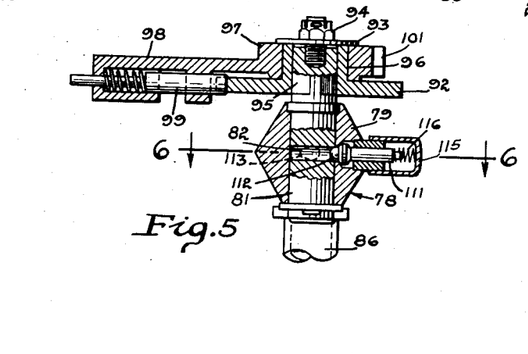
Figure 5 is an enlarged detail sectional view on the line 5—5 of Figure 4, showing the construction of the main control valve.
Figure 6:
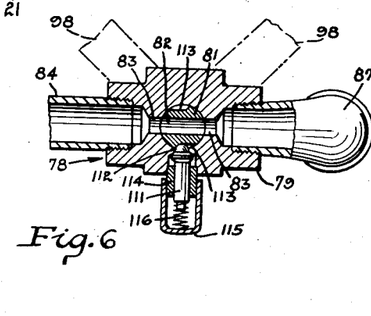
Figure 6 is a detail sectional view on the line 6—6 of Figure 5.

The means for operating the plug valve 81 is shown in Figures 3, 4, and 5, and comprises a ratchet 92 fixedly secured to the protruding end of the plug valve 81 by a suitable washer 93 and lock screw 94. The end portion 95 of the plug valve 81 is preferably squared as shown in Figure 5, to prevent relative rotation of the ratchet 92 thereon. The ratchet has a cylindrical hub 96 which provides a bearing for a hub 97 of an arm 98, which is retained upon the hub 96 of the ratchet by the washer 93, as will be clearly understood by reference to Figure 5.

A spring-actuated bolt 99 is mounted in the arm 98 and is adapted to engage the ratchet 92 and intermittently rotate it. Suitable means, not shown, is provided for preventing the bolt 99 from relatively rotating in its guides. Suitable gear teeth 101 are provided upon the hub 97 of the arm 98, which mesh with a rack 102 secured to a sleeve 103 having one end secured to an operating rod 104 by suitable bolts 105. The rear end portion of the sleeve 103 is slidably engaged with a rod 106 secured to the rear wall 48 of the hoist casing 47. The spring 107 is coiled about the rod 106 and has one end seated against the rack 102 and its other end against the head 48, whereby the sleeve 103 is constantly urged in a forward direction. The forward end of the sleeve 103 abuttingly engages the rear end of a tubular guide 108, as shown at 109. The tubular guide 108 may be suitably secured to the front wall 49 of the casing 47 by such means as welding.

Means is provided for securing the plug valve 81 of the valve 78 in its open and closed positions, as shown in Figures 5 and 6, and comprises a spring-actuated pin 111 having a ball point 112 adapted to engage the periphery of the plug valve 81. The ball point 112 of the pin 111 is situated in the plane of the fluid circulating passage 82 of the valve, and is adapted to engage a pair of diametrically disposed recesses 113 provided in the periphery of the valve 81. The pin 111 is slidably supported in a guide 114 having a cap 115 received in threaded engagement therewith, and in which is mounted a spring 116 which constantly bears against the outer terminal of the pin 111. By relatively rotating the cap 115 upon the guide 114, the tension of the spring may be varied. Because of the ratchet 92, the valve 81 always rotates in one direction, and approximately 90° for each oscillation of the arm 98, whereby the valve 78 will always come to rest with the passage 82 thereof alined with the ports 83, or at right angles thereto.

To control the movement of the load-carrying body 14, when being tilted from its normal to its load-dumping position, an auxiliary valve is provided, whereby a portion of the fluid circulated by the pump 65 is permitted to by-pass into the casing 47 in lieu of being pumped directly into the pipes 67 and 69 leading to the cylinders. This valve is best shown in Figures 3 and 4 and is generally indicated by the numeral 173. The valve 173 comprises a body 174 having an opening 175 which communicates with the pump 65, as best shown in Figure 4. A tapered seat 176 is provided in the body 174 adapted to receive a tapered plug valve 177 having a stem 178 slidably mounted in a guide in the front wall 49 of the hoist casing 47. A spring 179 is coiled about the stem 178 and has one end seated against a head 181 secured to the outer end of the stem 178, and having its opposite end seated against a packing box 182 secured to the wall 49. The spring 179 constantly urges the plug valve 177 into open position, as shown in Figure 4.

A discharge pipe 183 is connected to the pump body 174 and communicates with the passage 175 in the valve body, when the plug valve 177 is in open position. It will thus be seen that, under normal conditions, the fluid circulated by the pump 65 may by-pass through the valve 173 and back into the casing 47, particularly if the main valve 78 is closed. An adjusting screw 184 is shown mounted in one end of the valve body 174 and provides an abutment for the inner end of the plug valve 177 to prevent it from becoming wedged in its tapered seat 176.

A suitable L-shaped fitting 116 is secured to the rear wall 48 of the hoist and communicates with the interior of the casing 47. This fitting is provided with a screw plug or closure 117 which may be conveniently removed for introduction of the pressure fluid into the casing 47. The upper portion of the L-shaped fitting 116 is coincident with the proper level of the fluid in the casing 47 so that it may be used as a guide when filling the casing. A suitable breather pipe 118 is provided in the upper wall of the casing 47. This breather pipe has perforated caps 119 for establishing communication between the atmosphere and the interior of the casing.

To prevent the casing 47 of the hoist, and the mechanism contained therein, from becoming damaged as a result of tortional strains being imparted to the trailer frame 18, when traveling over rough, uneven ground, the forward end of the casing 47 is supported upon a single pivot 20, as best shown in Figure 4. This pivot is supported in the cross channel 33 of the trailer frame, and in a plate 30 secured to the cross member 32. A bracket 40 is suitably secured to the casing 47 and has a bore receiving the pivot 20. By thus pivotally suporting the forward end of the casing 47, and by securing the head 48 of the casing to the cross member 22 of the trailer frame, there is provided, in effect, a three-point suspension for the hoist, whereby tortional strains imparted to the trailer frame, will not effect the operation of the movable parts thereof.

*Fifth wheel*

Figure 9 illustrates the mechanism provided in the fifth wheel for transmitting power from the take-off shaft of the truck engine to the pump 65 of the hoisting mechanism. The fifth wheel structure is shown and described in detail in my pending application, Serial No. 679,643 and it will therefore be but briefly described in the present application.

As shown in Figure 9, the fifth wheel has a lower gear casing 121 having a shaft 122 mounted therein, one end of which is connected by a universal joint 123 to a splined shaft 124. The opposite end of the shaft 122 is supported in a guide bearing 125 provided in a removable plate or cap 126 having one end of a rod 127 connected thereto by a pin 128. The opposite end of the rod 127 is shown loosely supported between a pair of upstanding arms of a forked bracket 129, secured to the rear end portion of the frame of the truck chassis 2. A bevel gear 131 is suitably secured to the upright shaft 133 mounted in a tubular extension 134 provided on the upper wall of the gear casing 121. The tubular extension 134 is rotatably supported within the king pin 13. This king pin is adapted to be engaged by the coupling dogs 8 of the lower fifth wheel member 7, as hereinbefore described.

The king pin 13 is shown integrally formed with the plate 137 having upstanding portions 138 and 139 provided with suitable bearings for supporting a relatively short horizontal shaft 141. The plate 137 is suitably secured to the cross member 23 of the main supporting frame and to an auxiliary cross member 142 secured to the side members 21 of the main frame. A bevel gear 143 is secured to the upper end of the upright shaft 133 and meshes with a similar gear 144 secured to the forward end of the horizontal shaft 141. A universal coupling 145 is secured to the rear end of the shaft 141 and has a shaft 146 connecting it to a similar universal joint 147 secured to the shaft 148 of the pump 65, as clearly illustrated in Figure 2. A suitable housing 149 is secured to the plate 137 of the fifth wheel member and to the upper upright portion 139 thereof to provide a closure for the bevel gears 143 and 144. An annular member 151 is suitably secured to the cross members 23 and 24 of the main supporting frame of the trailer and cooperates with the plate 137 to provide the upper fifth wheel member.

The shaft 124 of the fifth wheel is operatively connected to the power take-off shaft 10 of the truck engine, whereby said shaft may be operated from the power of said engine. To thus connect the shaft 124 to the power take-off shaft 10, a shaft 152 is connected thereto by a universal joint 153. A splined coupling sleeve 154 is slidably engaged with the splined shaft 124, as shown in Figure 9, and has an extension 155 secured to the forward end thereof, adapted to receive the shaft section 152. The extension 155 may be secured to the splined sleeve 154 by such means as welding. The extension 155 is secured to the shaft 152 by suitable bolts 156, preferably arranged in right angular relation, as shown in Figure 9. When uncoupling the trailer from the truck, the coupling dogs 8 are released by manipulation of the locking bar 9, whereupon the truck may move out of engagement with the forward end of the trailer, it being understood that suitable means, not shown, is provided for supporting the forward end of the trailer when uncoupled from the truck. As the truck is moved away from the trailer, the splined coupling sleeve 154 will move out of engagement with the splined shaft extension 124, as will readily be understood by reference to Figure 9.

To couple the trailer to the truck, the latter is moved towards the trailer until the king pin 13 is received in the gap provided between the arms 12 of the lower fifth wheel member 7, whereby said arms will guide the king pin into engagement with the dogs 8—8 which, by the action of the king pin, will be moved to the position shown in Figure 7, whereby the locking bar 9 will automatically move into locking engagement with the dogs by the action of the springs 11.

The rearwardly extending rod 127 of the fifth wheel operates to longitudinally aline the shaft 122 with the truck body.

*Valve operating mechanism*

Another important feature of the invention resides in the means provided for actuating the valve 78. As shown in Figure 2, the forward end of the push rod 104 of the main valve 78 is slidably received in a guide aperture provided in the cross member 23 of the trailer frame. A suitable collar 157 is secured to said rod and is engaged by one end of a lever 158 pivoted at 159 to the cross member 23. The lever 158 is normally retained in the position shown in Figures 2 and 7 by the action of the spring 107 within the hoist, as shown in Figure 3.

Figure 8:
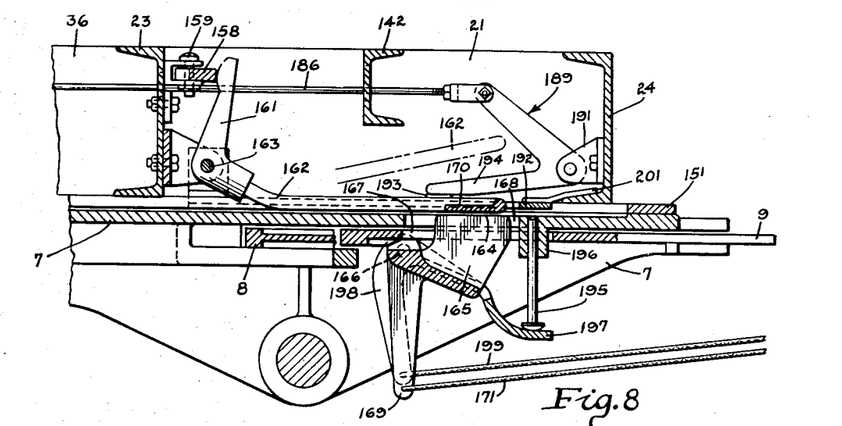
Figure 8 is an enlarged detail sectional view, showing the arrangement of the control levers at the front end of the trailer frame.

The lever 158 is actuated by an arm 161 secured to one leg of a U-shaped member 162 pivotally supported upon the cross member 23 by suitable pivots 163. The U-shaped member 162 is normally positioned as shown in Figure 8, and is adapted to be engaged by the upper edge 164 of an actuating member 165 pivoted at 166 to the lower fifth wheel member 7. The actuating member 165 traverses alined elongated openings or slots 167 and 168 provided respectively in the locking bar 9 and the horizontal wall portion of the lower fifth wheel member 7, as clearly shown in Figures 7, 8, and 9. The actuating member 165 has a depending arm 169 to which one end of a cable 171 is attached, the opposite end of which is attached to an operating lever 172 located convenient to the driver's seat within the cab of the vehicle. The U-shaped member 162 has a web 170 at its forward portion positioned to be engaged by the member 165, when the latter is actuated to oscillate the U-shaped member 162.

The means provided for operating the auxiliary valve 173 is best shown in Figures 2, 4, 7, and 8, and comprises a rod 186 having its rear end pivotally connected to one arm of a member 187 pivotally supported in a bracket 188 secured to the front wall 49 of the hoist. The opposite end of the member 187 bears against the head 181 of the valve stem 178, as clearly shown in Figures 2 and 3. The opposite end of the rod 186 passes through suitable clearance slots provided in the frame members 23 and 142, as shown in Figure 8, and is pivotally connected to one end of a bell crank 189. The bell crank 189 is shown pivotally supported upon the front frame member 24 by a suitable bracket 191.

The means for actuating the bell crank 189 comprises a semi-circular member 192 having its terminals pivotally connected to the pivots 163 supporting the U-shaped member 162, as best shown in Figures 7 and 8. The semi-circular member 192 has a projection 193, alined with the lower arm 194 of the bell crank 189, so that when the member 192 is elevated from the position shown in Figure 8, the projection 193 will engage and actuate the arm 194, whereupon the rod 196 will be moved forwardly to thereby depress the valve stem 178, with the result that the plug valve 177 will move into closing engagement with its seat 176 and thereby interrupt the circulation of fluid through the auxiliary valve 173.

The semi-circular member 192 is operated by a push rod 195 slidably supported in a suitable guide 196 and having its lower end positioned to be actuated by the leg 197 of a bell crank 198, the other leg of which has a cable 199 connecting it with an operating lever 200, best shown in Figure 9. A projection 201 is secured to the forward portion of the semi-circular member 192 adapted to engage the lower horizontal flange of the front frame member 24, thereby to limit the downward movement of the member 192, as will be clearly understood by reference to Figure 8.

By thus constructing the valve operating mechanism, the push rod 104 may be positively operated by the driver seated within the cab, regardless of the angular position of the truck with respect to the trailer. This results because the U-shaped member 162 partially surrounds the king pin 13 about whose axis the truck swings when turning corners, and because of the actuating member 165 being connected directly upon the lower fifth wheel member 7 supported on the truck. It will thus be noted that turning movement of the truck with respect to the trailer does not affect the cable 171. When the truck is longitudinally alined with the trailer, the actuating member 165 will engage the U-shaped member 162 at its forward intermediate portion, as best shown in Figure 7, and when the truck is angularly disposed with respect to the trailer, the actuating member 165 will engage the U-shaped member at one side of its intermediate portion, as will readily be understood by reference to Figures 7 and 8.

*Operation*

In the operation of this novel apparatus, the tilting movement of the load-carrying body 14 is controlled entirely by manipulation of the control levers 172 and 200. In Figure 11, the control levers are shown positioned directly back of the cab 5 of the truck, but it is to be understood that they may be located within the cab so that they may be conveniently manipulated by the driver, whereby the entire apparatus may be conveniently operated by one man. In Figure 5, the main valve 78 is shown in closed position, wherein it will be noted that the valve retaining bolt 111 is seated in one end of the fluid passage 82 in the plug valve 81. When the lever 172 is manipulated, the arm 98 of the valve 78 will be moved from the full to the dotted line position, shown in Figure 3, causing the plug valve 81 to rotate from the position shown in Figure 5 to that shown in Figure 6, wherein the fluid passage 82 will register with the ports 83 in the valve casing and thereby permit the flow of fluid through the valve from the pipe 84 to the pipe 86, the lower end of which communicates with the interior of the hoist casing through the apertures 91.

The pump 65, as a result of being connected directly to the power take-off shaft of the engine, operates continuously when said shaft is rotated, thereby causing the fluid to circulate through the pump. The auxiliary valve 173, as hereinbefore stated, is normally in open position as shown in Figure 4, whereby the oil or fluid may circulate freely through said pump and by-pass back into the reservoir provided within the casing 47. The fluid will circulate through the auxiliary valve 173, as above described, regardless of the position of the main control valve 78, assuming, of course, that the auxiliary valve is in its normal open position.

To tilt the body, the main control valve 78 is first closed by manipulation of the operating lever 172, after which the operator manipulates the control lever 200 of the auxiliary valve 173, thereby to interrupt the circulation of the fluid through said valve. When the auxiliary valve 173 is closed, as above stated, the fluid is forced through the pipe 67, check valve 68, pipe 69, and into the distributing passage 75 communicating with the cylinders 51, thereby causing the pistons to be thrust forwardly by the action of the fluid being pumped into the cylinders. Such forward movement of the pistons will cause the equalizer bar 45 to move forwardly and thereby actuate the chains 39 and cause rotation of the cam members 34 on their pivots. Such action of the cam members will tilt the body 14 to an inclined load-dumping position. Should the operator inadvertently neglect to open the auxiliary valve 173, or the main valve 78, when the hoist is operating to tilt the body 14, the pressure fluid pumped into the cylinders will be automatically released therefrom, when the pistons reach the dotted line position shown in the upper portion of Figure 3, because of the pistons passing the relief ports 76, and permitting the fluid to escape from the cylinders into the reservoir within the casing 47.

The main valve 78 is either fully open or completely closed, because of the ratchet mechanism provided for actuating its plug valve 81. The traveling movement or speed of the load-carrying body from normal to load-dumping position therefore, is not controlled by the main valve 78 but is controlled by manipulation of the auxiliary valve 173. When the main valve 78 is closed, and the operator closes the auxiliary valve 173, the pump will force the fluid into the cylinders back of the pistons, as hereinbefore described, whereupon the body immediately begins to tilt upwardly. To retard the tilting movement of the body, the operator slightly opens the auxiliary valve 173, whereby a portion of the fluid will pass through said valve back into the reservoir, defined by the casing 47. If it is desired to completely interrupt the upward tilting movement of the body, the auxiliary valve is completely opened, whereby all of the fluid circulating through the pump will by-pass through the auxiliary valve 173 and back into the reservoir, during which time the pistons will be held in fixed positions within their respective cylinders, because of the check valve 68 and closed valve 78 preventing the fluid in the cylinders from discharging therefrom. To lower the body to its normal horizontal position, the main control valve 78 is opened.

It will thus be seen that by the provision of the control valves 78 and 173, the tilting movement of the load-carrying body 14 may be controlled at will. The auxiliary valve 173 is normally in open position, as hereinbefore stated, whereby the operator or driver must hold the control lever 200 of said valve in operative position, when dumping the load. If desired, the action of the auxiliary valve 173 may be reversed so that it is normally retained in closed position, but in actual practice, it has been found more desirable to normally retain said valve in open position, as above set forth.

All moving parts within the hoist casing 47 are adequately lubricated as a result of the splashing and spraying of the oil within said casing during the operation of the hoist. In the drawings, I have shown the hoist as comprising two cylinders, but it is to be understood that in some instances, it may be desirable to use but a single cylinder, in which case, said cylinder would preferably be alined with the longitudinal centerline of the trailer so as to minimize side or lateral strains.

Because of the novel construction and arrangement of the operating mechanism and the associated parts of the semi-trailer, the trailer may be made comparatively short, which is an important feature, in that the over-all length of the apparatus may be considerably reduced as compared to apparatus of this general nature. As hereinbefore stated, the construction of the cam members 34 and the means for operating them is of utmost importance in that it substantially equalizes the power required to lift the load from its normal horizontal position, shown in Figure 1, to the inclined load dumping position, shown in dotted lines. It is also to be noted that the load-carrying body 14 is so mounted upon the main frame of the trailer that when tilted to a load-dumping position, the center of gravity thereof will be forwardly of the rear axle 26, whereby the trailer cannot tip over rearwardly.

The control mechanism for the dump body 14, as herein disclosed, offers the utmost in simplicity, as the raising and lowering of the dump body is controlled entirely by the manipulation of the control levers 172 and 200. The fifth wheel is so constructed as to simplify the operation of coupling the trailer to the truck or uncoupling it therefrom. The drive shaft between the power take-off shaft 10 of the truck engine and the horizontal shaft 122 of the upper fifth wheel member is automatically uncoupled when the truck is moved away from the trailer because of the splined coupling sleeve 154 moving out of engagement with the splined shaft extension 124.

When the body is tilted to a maximum height, as indicated by the dotted lines in Figure 1, the springs 202 connected to the cam members 34 will be compressed, and thereby initially start the return movement of the body to its normal horizontal position, and eliminate any danger of the body failing to return to its normal horizontal position when the main valve 78 is opened to release the fluid pressure from the cylinders 51.

I claim as my invention:

1. In a semi-trailer adapted to be connected to a truck or a tractor, a frame comprising side members connected together by suitable cross members, auxiliary frame members secured to certain of said cross members and disposed in spaced parallel relation to said side members, a load-carrying body pivotally mounted on said frame, cam members rotatably mounted in the spaces between said side members and said auxiliary frame members and having sprocket teeth in their peripheries, arms pivotally connecting said cam members to said body, chains operatively engaged with the teeth on said cam members and having their rear terminals suitably secured to said members, said auxiliary side members having guide slots therein, an equalizer bar slidably supported in said guide slots and connected to said chains, a hoist mounted in said frame and having a reciprocal member operatively connected to said equalizer bar, and means for controlling the operation of the hoist whereby said cam members may be actuated to tilt the body to load-dumping position.

2. In a semi-trailer having means for connecting it to a truck or a tractor, a pair of main side members, auxiliary side members spaced inwardly from said main side members, said inner and outer side members being connected together at the front and rear by suitable cross members to provide a structural frame, a load-carrying body pivotally mounted on said frame, cam members rotatably mounted on said frame between said main and auxiliary frame members, flexible elements secured to said cam members, an equalizer bar slidably supported in said auxiliary side frame members and prevented from longitudinal movement by the main frame members, a suitable hoisting mechanism mounted in said frame between the auxiliary frame members and having a member mounted for movement lengthwise of the frame and operatively connected to the equalizer bar, and means for controlling the operation of said hoisting mechanism, whereby the equalizer bar is operated to actuate said cam members and tilt the body to load dumping position.

3. In a semi-trailer having means for connecting it to a truck or a tractor, a pair of main side members, auxiliary side members spaced inwardly from said main side members, said inner and outer side members being connected together at the front and rear by suitable cross members to provide a structural frame, a load-carrying body pivotally mounted on said frame, cam members rotatably mounted on said frame, said auxiliary frame members having horizontal slots therein, flexible elements secured to said cam members, an equalizer bar slidably supported in said slots and having its ends disposed adjacent to said main frame members, a suitable hoisting mechanism mounted in said frame between said inner frame members and having an operative connection with said equalizer bar, means for controlling the operation of said hoisting mechanism, whereby said cam members may be actuated to tilt the body to load dumping position, and links pivotally connected to said cam members and having cushion means thereon adapted to cushion the rearward tilting movement of the dumping body.

HAROLD A. CEDERSTROM.